(No Model.)
H. FRASCH.
PROCESS OF AND APPARATUS FOR MAKING WHITE LEAD.
No. 281,047. Patented July 10, 1883.
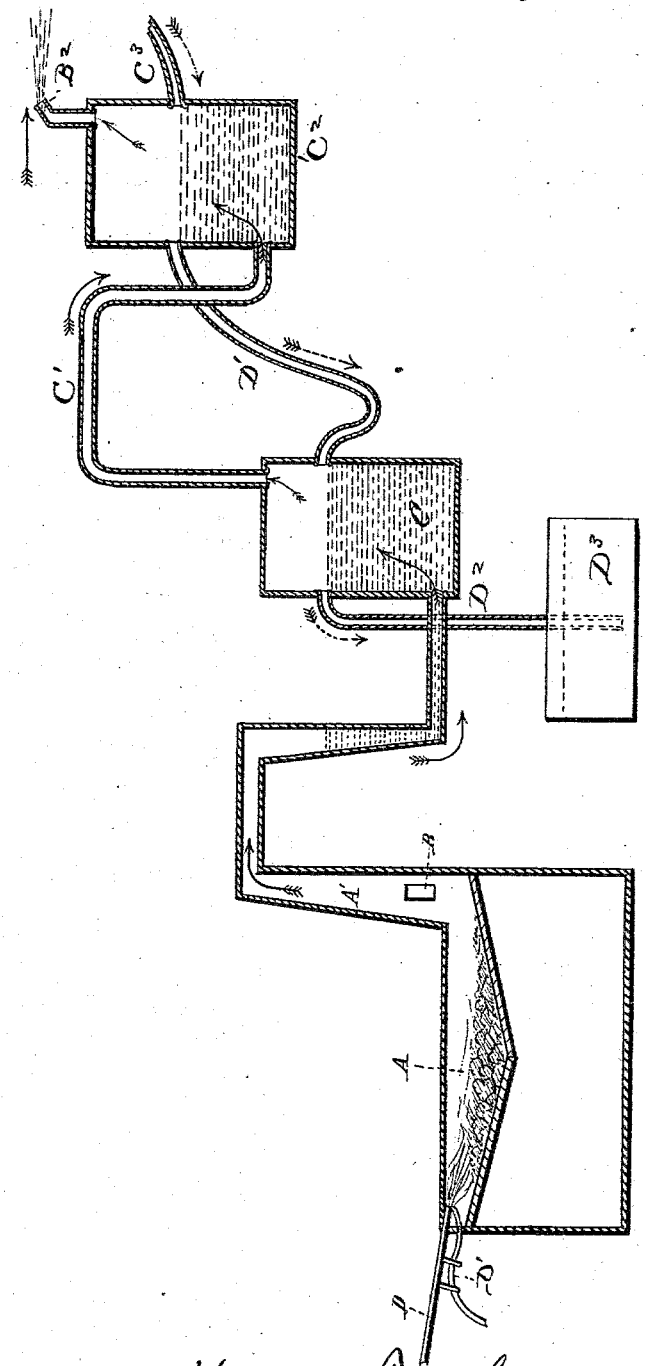
WITNESSES
Herman Moran
Jno. Crowell Jr.
Hermann Frasch INVENTOR
By Leggett & Leggett
ATTORNEYS

UNITED STATES PATENT OFFICE.

HERMANN FRASCH, OF CLEVELAND, OHIO.

PROCESS OF AND APPARATUS FOR MAKING WHITE LEAD.

SPECIFICATION forming part of Letters Patent No. 281,047, dated July 10, 1883.

Application filed April 21, 1882. (No model.)

*To all whom it may concern:*

Be it known that I, HERMANN FRASCH, of Cleveland, in the county of Cuyahoga and State of Ohio, have invented certain new and useful Improvements in Processes of and Mechanism for Making White Lead; and I do hereby declare the following to be a full, clear, and exact description of the invention, such as will enable others skilled in the art to which it pertains to make and use it, reference being had to the accompanying drawing, which forms part of this specification.

My invention relates to the manufacture of white lead; and it consists of the following process and mechanism for the manufacture of white lead that I shall proceed to describe.

In practicing my invention I take lead ore (lead sulphide galena) and subject it on the hearth of a covered furnace to the flame of a petroleum jet, or a jet mixed with enough air to produce a neutral or non-oxidizing atmosphere. The lead sulphide is volatilized, and escapes into the flue on the furnace. Here I admit enough air to convert the lead-sulphide vapors into lead sulphate, and the lead-sulphate particles suspended in the combustion-gases I pass through one, two, or more columns of water by means of a steam-jet. These water columns I prefer to intersect with perforated screens of willow-ware or any suitable substance to subdivide the gases in which the lead is suspended, so that all the lead remains in the water, the combustion-gases alone passing on and escaping. The lead sulphate thus obtained is in a state of fine division, and contains but a small quantity of free sulphuric acid. To convert this (the lead sulphate) into white and chemically pure lead carbonate, I treat it with a solution of ammonium carbonate. This will interchange with the lead, and lead carbonate (insoluble) and ammonia sulphate (soluble) will be the result. I wash the precipitate on suitable filters, preferably vacuum-filters, and in this manner obtain a perfectly pure lead carbonate. The ammonia-sulphate solution I introduce into a suitable vessel with burned lime. This will regenerate the ammonia. With the ammonia gases I mix the carbonic-acid gases from the lime-kiln burning the limestone, and these gases absorbed by water furnish the solution necessary to decompose the lead sulphate. In this manner only limestone, lead ore, and fuel are consumed in the process of making white lead, as the ammonia is continually regenerated and needs to be replenished only as the small mechanical loss diminishes its quantity.

The quality of lead carbonate (white lead) is as good when produced by this process as any produced by any of the old processes. Moreover, by the method above described the time, labor, and expense in producing white lead are greatly diminished, nor is it necessary, as has heretofore been the case, that lead of any standard purity should be furnished from which to make the carbonate.

I do not limit myself narrowly to the use of a petroleum or a gas jet, as above specified, as any pure, clean flame may be employed.

The drawing diagrammatically illustrates a system of apparatus for practicing my process.

A represents a furnace in which the lead ore is placed and subjected to the action of a flame produced by petroleum and air or steam, the petroleum being admitted through the pipe D, and air or steam through the pipe B. The lead sulphide is volatilized, and escapes into the flue A', into which air is admitted through the air-inlet B, and operates to convert the lead vapors into lead sulphate, which is, by the action of the exhaust-steam jet $B^2$, drawn into the lower portion of the water-chamber C, the uncondensed products that escape from the chamber C passing upwardly through the tank $C^2$. By passing the combustion-gases and the lead-sulphate particles through the columns of water, as described, the lead is retained suspended in the water, and by admitting a continuous supply of water through the inlet $C^3$ the water containing the lead sulphate is caused to pass through the overflow-pipes D' $D^2$ and escape into the receptacle $D^3$, from which the lead is collected, as has been described.

I am aware of a description of a process for making carbonate of lead, said process consisting in placing a mixture of sulphate of lead and soluble carbonate of soda in a closed iron vessel and subjecting it to heat under pressure. The product is thrown into a filter and well washed. The sulphate of lead is drawn off, leaving the carbonate of lead, and I would have it understood that I make no claim to such process, as my improved process is radically different therefrom.

What I claim is—

1. The process of making white lead, substantially as hereinbefore described, consisting in subjecting lead sulphide to the action of a flame and volatilizing the lead, then admitting air to the lead-sulphide vapors and converting them into lead sulphate, then passing the lead-sulphate fumes through liquid and collecting the lead sulphate therefrom, and afterward treating the lead sulphate with ammonium carbonate or other volatile carbonate base, substantially as set forth.

2. An apparatus for the manufacture of white lead, consisting of the combination of the closed furnace A, means for producing a flame within the furnace, escape-pipe A', having an inlet, B, liquid-tanks C C$^2$, discharge-pipes D$^2$ D', pipe C', and receptacle D$^3$, substantially as set forth.

In testimony whereof I have signed my name to this specification in the presence of two subscribing witnesses.

HERMANN FRASCH.

Witnesses:
LEVERETT L. LEGGETT,
JNO. CROWELL, Jr.